(12) United States Patent
Saptharishi et al.

(10) Patent No.: US 10,011,370 B2
(45) Date of Patent: Jul. 3, 2018

(54) AIRCRAFT SYSTEMS AND METHODS WITH WEARABLE DEVICE ALERTS

(71) Applicant: HONEYWELL INTERNATIONAL INC., Morris Plains, NJ (US)

(72) Inventors: Hariharan Saptharishi, Tamilnadu (IN); Gobinathan Baladhandapani, TamilNadu (IN); Sue McCullough, Phoeniz, AZ (US); Eric Christianson, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 66 days.

(21) Appl. No.: 14/920,315

(22) Filed: Oct. 22, 2015

(65) Prior Publication Data

US 2017/0113810 A1    Apr. 27, 2017

(51) Int. Cl.
| | |
|---|---|
| *B64D 45/00* | (2006.01) |
| *G04G 21/00* | (2010.01) |
| *G06F 1/16* | (2006.01) |
| *G07C 5/08* | (2006.01) |

(52) U.S. Cl.
CPC ............. *B64D 45/00* (2013.01); *G04G 21/00* (2013.01); *G06F 1/163* (2013.01); *G07C 5/0808* (2013.01); *G07C 5/0816* (2013.01)

(58) Field of Classification Search
CPC ...................................................... G08B 23/00
See application file for complete search history.

(56) References Cited

U.S. PATENT DOCUMENTS

| | | |
|---|---|---|
| 4,644,538 A | 2/1987 | Cooper et al. |
| 4,775,116 A | 10/1988 | Klein |
| 5,506,590 A | 4/1996 | Minter |

(Continued)

FOREIGN PATENT DOCUMENTS

| | | |
|---|---|---|
| CA | 2679708 A1 | 5/2002 |
| EP | 1301836 A2 | 4/2003 |

(Continued)

OTHER PUBLICATIONS

Technical Research Centre of Finland (VTT); Utilization of smartwatches in situations requiring alerts; Science News, Mar. 23, 2015.

(Continued)

*Primary Examiner* — Joseph Feild
*Assistant Examiner* — Pameshanand Mahase
(74) *Attorney, Agent, or Firm* — Lorenz & Kopf, LLP

(57) ABSTRACT

A wearable device is provided to be worn by an operator of an aircraft. The wearable device includes a communication unit configured to receive aircraft parameters from an aircraft system; a database configured to store a rule set that defines at least a first rule with a first alert condition and a first response associated with the first alert condition; a processing unit coupled to the communication unit and the database, the processing unit configured to evaluate the first alert condition in view of the aircraft parameters and to initiate the first response when the aircraft parameters violate the first condition; and an alert unit coupled to the processing unit and configured to communicate the first response to the operator.

20 Claims, 5 Drawing Sheets

(56) References Cited

U.S. PATENT DOCUMENTS

| | | | |
|---|---|---|---|
| 5,933,099 A * | 8/1999 | Mahon | G08G 5/0008 340/945 |
| 6,252,525 B1 * | 6/2001 | Philiben | G01S 1/70 340/961 |
| 6,452,510 B1 | 9/2002 | Zysko | |
| 6,477,117 B1 * | 11/2002 | Narayanaswami | G04G 13/026 368/224 |
| 6,608,568 B1 | 8/2003 | Ruchti | |
| 6,919,808 B2 | 7/2005 | Longere | |
| 7,555,372 B2 | 6/2009 | Dwyer | |
| 2003/0169173 A1 * | 9/2003 | Longere | B64D 45/0015 340/576 |
| 2011/0063136 A1 | 3/2011 | Fabas et al. | |
| 2014/0267020 A1 * | 9/2014 | Ishibashi | G06F 3/014 345/156 |
| 2015/0149018 A1 * | 5/2015 | Attard | G05D 1/0061 701/23 |
| 2015/0278498 A1 | 10/2015 | Hong et al. | |

FOREIGN PATENT DOCUMENTS

| | | |
|---|---|---|
| EP | 2397405 A1 | 12/2011 |
| EP | 2939924 A1 | 4/2015 |
| FR | 2980616 A1 | 3/2013 |
| JP | 2002287846 A | 10/2002 |
| WO | 2002035491 A1 | 5/2002 |
| WO | 2002040943 | 5/2002 |
| WO | 2004038669 A1 | 5/2004 |

OTHER PUBLICATIONS

Thurber, M.; WingX Pro7 Supports Pebble Smart Watch Navigation Display; Apr. 1, 2014.

Extended EP Search Report for Application No. 16194256.0-1803 dated Mar. 24, 2017.

* cited by examiner

AIRCRAFT SYSTEMS AND METHODS WITH WEARABLE DEVICE ALERTS

TECHNICAL FIELD

The present invention generally relates to aircraft systems and methods, and more particularly relates to aircraft systems and methods that provide alerts to an operator through a wearable device.

BACKGROUND

Modern aircraft systems continue to advance in sophistication and complexity. As aircraft systems advance, the number of tasks required by flight crews to operate the aircraft in a safe and efficient manner also increases. As examples, flight crews typically monitor and interact with numerous types of systems associated with the aircraft, including communications systems, navigation systems, flight management systems, flight control systems, display systems, collision avoidance systems, weather systems, and radar systems. At times, these systems may issue warnings or alerts that require the attention of the flight crew. Given the number of systems and tasks, it may be challenging to maintain efficient operation. The situation may be further complicated by the number of flight crew members that may be responsible for operation.

Accordingly, it is desirable to provide systems and methods to communicate alerts and warnings to the flight crew in an improved manner. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a wearable device is provided to be worn by an operator of an aircraft. The wearable device includes a communication unit configured to receive aircraft parameters from an aircraft system; a database configured to store a rule set that defines at least a first rule with a first alert condition and a first response associated with the first alert condition; a processing unit coupled to the communication unit and the database, the processing unit configured to evaluate the first alert condition in view of the aircraft parameters and to initiate the first response when the aircraft parameters violate the first condition; and an alert unit coupled to the processing unit and configured to communicate the first response to the operator.

In accordance with another exemplary embodiment, an aircraft system includes an aircraft data source configured to generate aircraft parameters; and a wearable device configured to be worn by an operator and coupled to the aircraft data source. The wearable device includes a communication unit configured to receive the aircraft parameters from the aircraft data source; database configured to store a rule set that defines at least a first rule with a first alert condition and a first response associated with the first alert condition; a processing unit coupled to the communication unit and the database, the processing unit configured to evaluate the first alert condition in view of the aircraft parameters and to initiate the first response when the aircraft parameters violate the first condition; and an alert unit coupled to the processing unit and configured to communicate the first response to the operator.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments described herein include aircraft systems and methods in which a wearable device communicates directly with aircraft data sources. In one exemplary embodiment, the wearable device receives aircraft parameters from aircraft systems and, as appropriate, communicates alerts to the operator wearing the wearable device based on a rule set stored on the wearable device.

Figure 1:
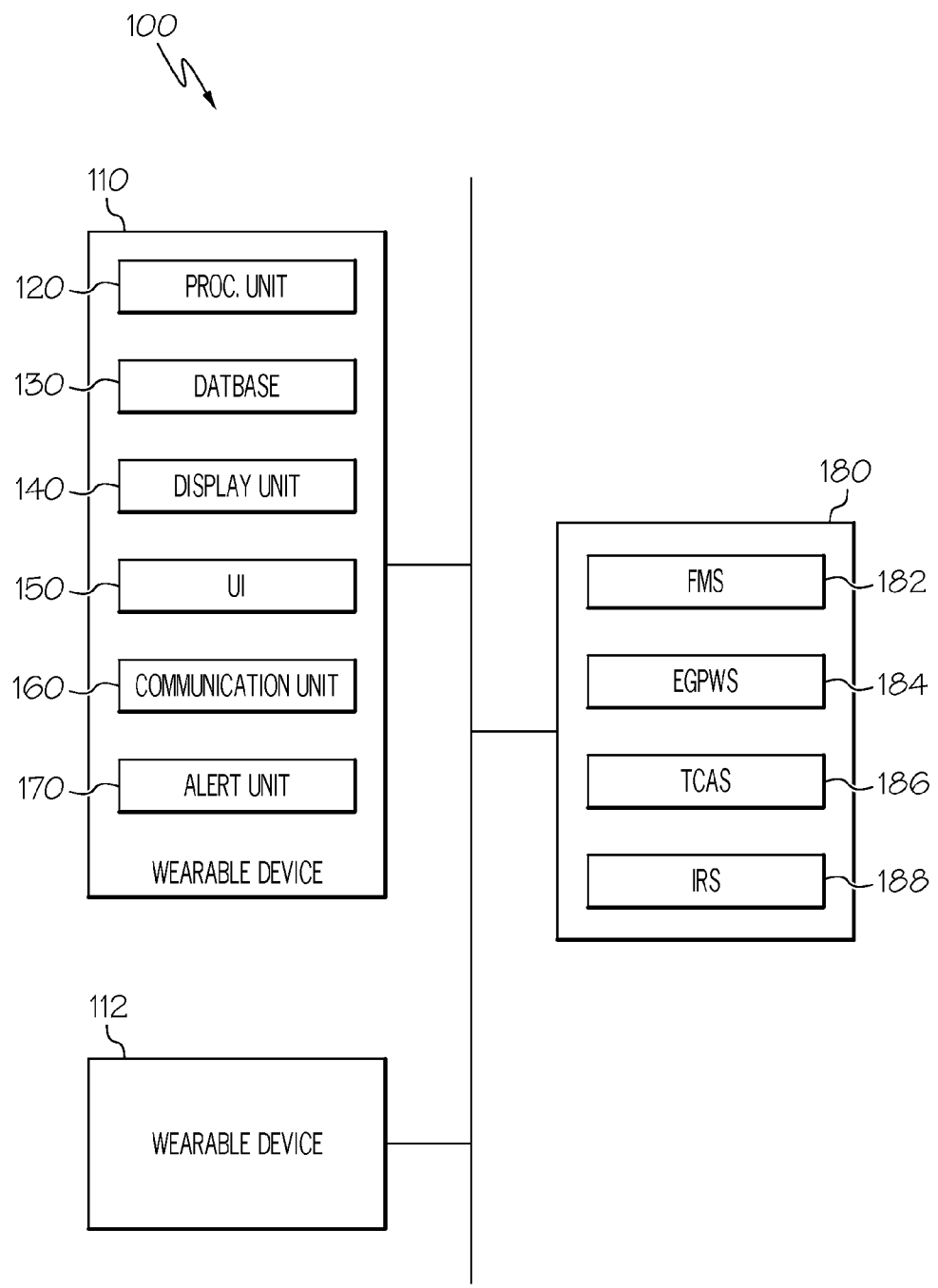
FIG. 1 is a schematic diagram of an aircraft system in accordance with an exemplary embodiment.

FIG. 1 is a schematic representation of an aircraft system 100 that includes a wearable device 110 that interacts with various data sources 180. The components and subcomponents of system 100 may be coupled together in any suitable manner, such with as a data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. As described below, the aircraft system 100 generally functions to provide alerts and other types of information to an operator (generally, a pilot or other member of a flight crew) on the wearable device 110. Additional information about the operation will be provided below after a brief introduction of each component.

Generally, the wearable device 110 is a personal device worn or carried by the operator. In one exemplary embodiment, the wearable device 110 is a watch or "smart watch" that is attached or mounted on the wrist of the user, such an Apple or Android watch. Typically, the wearable device 110 has a "watch face" functioning as a display device and one or more user interface elements, such as buttons along the circumference of the watch face and/or a touchscreen on the display device. Although the wearable device 110 is described with respect to a "watch" form factor, the wearable device 110 may also be worn on body locations other than the wrist, such as a thigh or waist, and/or have a form other than a watch, such as a tablet. Such devices 110 typically have the capability to interact with many types of systems, including smart phones and computer systems. Additional information regarding the form of the wearable device 110 is provided below with reference to FIG. 2.

FIG. 1 depicts one example of architecture for describing the function and operation of the wearable device 110. Other arrangements or structure may be possible. As shown, the wearable device 110 includes a processing unit (or controller) 120, a database 130, a display unit 140, a user interface 150, a communication unit 160, and an alert unit 170. In one exemplary embodiment, these components are collectively integrated into the wearable device 110, although in other embodiments, the various functions may be distributed or implemented by components outside of the wearable device 110. Although not specifically shown, the wearable device 110 may include a number of additional components that are common to watches and mobile devices, including GPS units and various types of sensors, including motion sensors. In some exemplary embodiments, components may be included or omitted from the wearable device 110 depending on the additional desired functionality and/or cost. As an example, in one exemplary embodiment, the GPS unit and sensors described above may be omitted.

Figure 2:
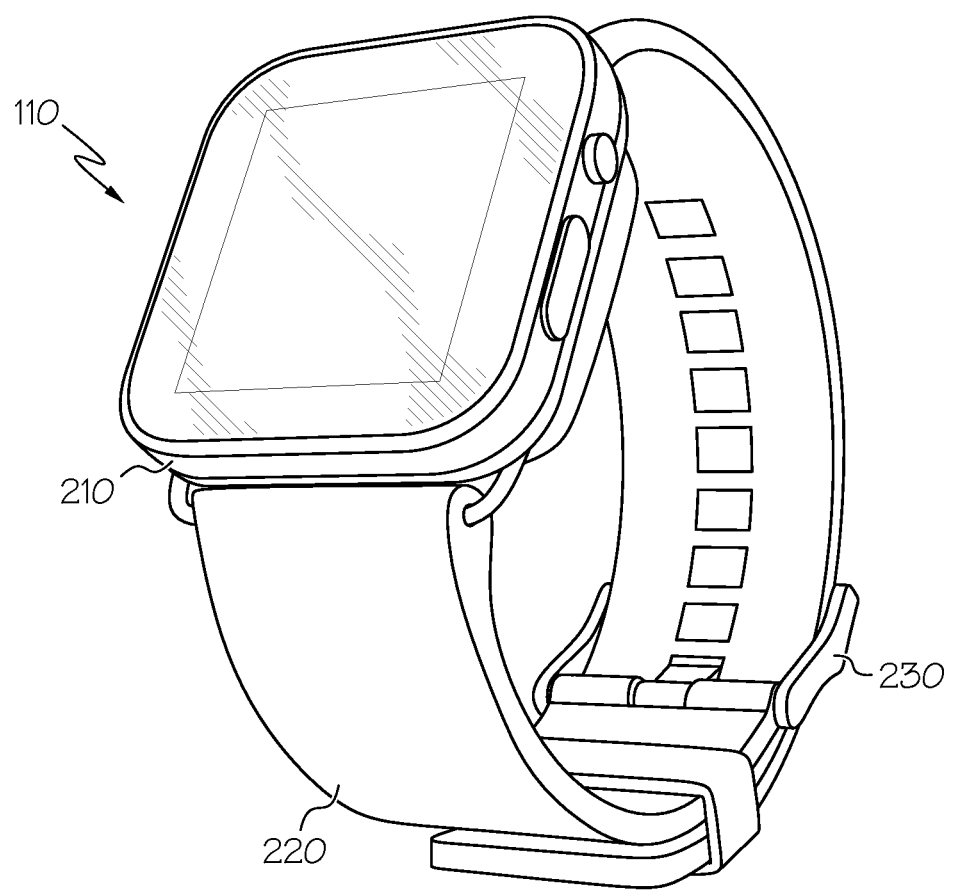
FIG. 2 is an isometric view of a wearable device of the aircraft system of FIG. 1 in accordance with an exemplary embodiment.

Reference is briefly made to FIG. 2, which depicts a simplified view of an exemplary form of the wearable device 110 in accordance with an exemplary embodiment. As shown in FIG. 2, the wearable device 110 may include a case body 210 that at least partially houses the hardware and software components of the wearable device 110, including processing unit 120, database 130, display unit 140, user interface 150, communication unit 160, and alert unit 170 shown in the schematic representation of FIG. 1. The case body 210 may be attached to a strap 220 with a buckle 230 for securing the wearable device 110 to the arm of the operator.

Returning to FIG. 1, in one exemplary embodiment, the processing unit 120 generally functions to at least receive and/or retrieve aircraft flight management and other operations information (generally, "aircraft parameters") from various sources, including the data sources 180 via communication unit 160. In one exemplary embodiment and as discussed in greater detail below, the processing unit 120 may further evaluate the aircraft parameters in view of processing rules stored in the database 130. Based on the results of this evaluation, the processing unit 120 may generate an alert for the operator via the alert unit 170. The processing unit 120 may further generate display commands for display of operations information and/or alert information on the display unit 140. Additionally, the processing unit 120 may receive operator input via the user interface 150. In one exemplary embodiment, the processing functionality of the processing unit 120 described below occur within the wearable device 110, although some embodiments may have other arrangements.

Depending on the embodiment, the processing unit 120 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processing unit 120 includes processing logic that may be configured to carry out the functions, techniques, and processing tasks or methods associated with operation of the system 100.

The database 130 may include any suitable type of memory or data storage, such as for example, RAM, ROM, EEPROM, flash memory, optical or magnetic storage devices, or any other medium that can be used to store and access desired information, including information for operating the wearable device 110. As discussed in greater detail below, the database 130 may also store information associated with a rule set of alert rules that are processed by the processing unit 120 to evaluate the aircraft parameters and initiate alerts, as discussed in greater detail below.

The display unit 140 is coupled to the processing unit 120 for rendering information to the operator on the wearable device 110 in response to display commands generated by the processing unit 120 and/or alert unit 170. As is typical, the display unit 140 may be positioned on a surface of the wearable device 110 that is facing the operator. Any suitable type of display unit 140 may be provided, including an LCD unit, LED display unit, and/or OLED display unit.

The user interface 150 is coupled to the processing unit 120 to allow a user to interact with the other components of the wearable device 110, as well as other elements of the aircraft system 100. The user interface 150 may be realized as a keypad, touchpad, keyboard, mouse, touch panel, joystick, knob, line select key or another suitable device adapted to receive input from a user. In further embodiments, the user interface 150 is realized as audio input and output devices, such as a speaker, microphone, audio transducer, audio sensor, or the like. In some embodiments, the user interface 150 may be incorporated into the display unit 140. For example, in one embodiment, the user interface 150 may be integrated into the display unit 140 as a touchscreen and/or other mechanisms for function, display, and/or cursor control.

The communication unit 160 is coupled to the processing unit 120 and generally represents the combination of hardware, software, firmware and/or other components configured to support communications (e.g., send and/or receive information) between the wearable device 110 and the data sources 180, as well as other sources of information, such as, for example, using data link avionics, a data link infrastructure, and/or a data link service provider. In one exemplary embodiment, the communication unit 160 may incorporate or otherwise support a Wireless Application Protocol ("WAP") used to provide communications links to mobile computers, mobile phones, portable handheld devices, and connectivity to the Internet. Additionally, the communication unit 160 may support BlueTooth, radio, and other communications protocols, including IEEE 802.11 or other RF protocols. In one exemplary embodiment, the communication unit 160 communicates with other aircraft systems, particularly data sources 180 in accordance with an avionics standard, such as ARINC 429 protocol or via avionics standard communications bus (ASCB).

The alert unit 170 is coupled to the processing unit 120 and generally represents one or more aspects of the wearable device 110 that functions to produce an alert. The alert unit 170 may take one of numerous forms. For example, the alert unit 170 may produce a visual warning on the display unit 140. In other embodiments, the alert unit 170 may be in the form of a speaker to generate an audible warning. The alert unit 170 may also include one or more haptic components, such as a motor or element that vibrates the case of the wearable device 110 or an element on the underside of the wearable device 110 that physically taps or "pokes" the operator wearing the wearable device 110.

The data sources 180 generally represent the aircraft systems and subsystems that provide information to the wearable device 110. In one exemplary embodiment, the data sources 180 include a flight management system (FMS) 182, an enhanced ground proximity warning system (EGPWS) 184, a traffic collision and avoidance system (TCAS) 186, and an inertial reference system (IRS) 188. Generally, the FMS 182 functions to support navigation, flight planning, and other aircraft control functions, as well as provide real-time data and/or information regarding the operational status of the aircraft. The FMS 182 may include or otherwise access one or more of the following: a weather system, an air traffic management system, a radar system, a traffic avoidance system, an autopilot system, a flight control system, crew alerting systems, electronic checklist systems, an electronic flight bag, and/or other suitable avionics systems. The EGPWS 184 functions to monitor the position of the aircraft relative to the ground and to generate a warning if the aircraft is too close to an obstacle. The TCAS 186 functions to monitor the position of the aircraft relative to other aircraft in the surrounding airspace and to generate a warning if the other aircraft pose a risk. The IRS 188 functions to continuously calculate the position, orientation, and velocity of the aircraft and to generate an alert if an aircraft maneuver or condition poses a risk. Although not shown, additional types of data sources 180 may provide information to the wearable device 110.

The wearable device 110 discussed above refers to a single wearable device that is worn by a single operator. In some exemplary embodiments, one or more additional wearable devices 112 may be incorporated into the system 100, one of which is depicted in FIG. 1. Such additional wearable devices 112 may have the same architecture and function as described above. Individual wearable devices 110, 112 may have the same or different rule sets, for example, as a function of the position or identity of the person wearing the respective device. As such, each wearable device 110, 112 may have an identification that may be incorporated into the rule set for evaluation of the conditions and resulting alerts. In some of the examples discussed below, system operators may be assigned according to a position, role, or identity such that the alerts may be specific to an individual operator. For example, certain types of alerts may be suitable for a captain operator and other types of alerts may be suitable for a first officer operator, and the rule set of the wearable device 110, 112 may be implemented accordingly. The identification, role, or position associated with the individual wearable device 110, 112 may be manually set by the respective operator via the respective user interface 150 or other suitable manner. Unless otherwise noted, the term "operator" refers to any operator wearing one of the wearable devices 110, even though additional wearable devices 112 may be present. Moreover, any discussion herein regarding wearable device 110 is also applicable to wearable device 112.

Figure 3:
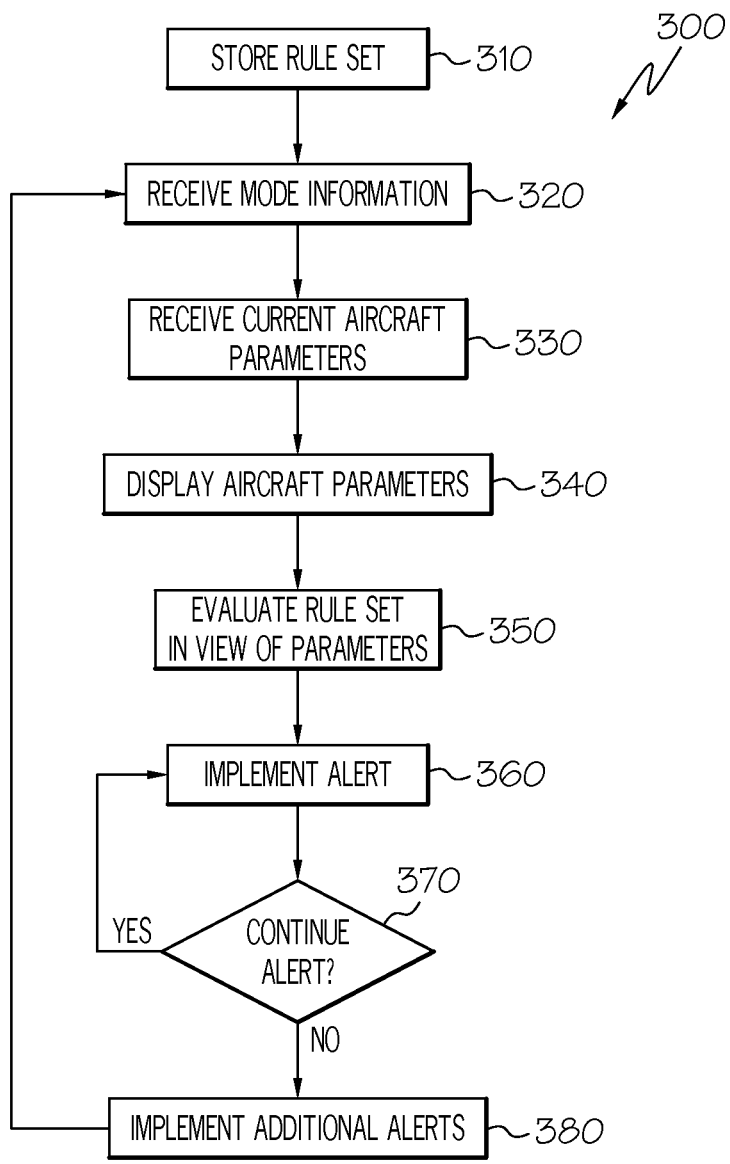
FIG. 3 is a flowchart representing a method for communicating alerts to aircraft operators in accordance with an exemplary embodiment.

Operation of the system 100 will be described below with reference to FIG. 3, which is a flowchart representing a method 300 for communicating alerts to aircraft operators. The method 300 may be implemented with the system 100 of FIG. 1, and as such, FIG. 1 is referenced below.

In one exemplary embodiment, the method 300 is typically implemented by an operator wearing the wearable device 110 when the operator is on or in the vicinity of the aircraft, typically in preparation for or during a flight operation. As noted above, additional wearable devices 112 may be provided for additional operators, and unless otherwise noted, the steps of method 300 are also applicable to the additional wearable devices 112.

In a first step 310, wearable device 110 stores the rule set in database 130. The rule set may be preloaded in the database 130 and/or entered by the operator via the user interface 150. In one exemplary embodiment, the rule set is stored on the wearable device 110 itself, and the rule set may be created and/or modified via an application interface on the wearable device 110 or an associated processing system that communicates with the wearable device 110 to load the appropriate rule set. In some embodiments, the rule set may be loaded into the database wirelessly. Generally, the rule set includes a collection of rules, each of which defines a parameter condition that must be met by the aircraft at a given point in time or other reference scenario and a resulting response (e.g., an alert) when the condition is not met. In some embodiments, the rule set may be applicable to typical situations or flights, while in other embodiments the rule set may be mission specific. As used herein, the term "alert" may be used interchangeably with the terms "warning" and "alarm", and generally refers to any type of information to be communicated to an operator upon satisfying or violating a condition, as appropriate.

The rule set may have any suitable format. As one example, the format of each rule is <If [mode/condition], then [condition] else [result] and [param1, param2 . . . param N] @ [operator]>.

The rule set may be particularly beneficial in the form of an operator and aircraft checklist in which predefined keywords are used to define the modes, conditions, results, and operators. An exemplary rule set is listed below:

If Preflight, then
Set Parking Brake else [vibrate and chime] and [parking brake status] @ CAPT AND FO
Set Throttle to IDLE else [vibrate and chime] and [throttle status] @ CAPT AND FO
Set BATT Master Switch to ON else [vibrate and chime] and [BATT Master Switch Status] @ FO
Set Flaps up else [vibrate and chime] and [flaps status] @ CAPT AND FO
Retract Spoiler else [vibrate and chime] and [spoiler status]@ FO
If Start Up, then
Set Thrust Levers to IDLE else message ("Set Thrust Levers to IDLE") @ CAPT
Set Mode Selector to IGN/START else message ("Set Mode Selector to IGN/START") @ CAPT
If Take Off, then
Set Brakes else message ("Set Brakes") @ CAPT
Set Throttle else message ("Set Throttle") @ CAPT
Set Flaps to POS 2 else Vibrate, Chime. Flash, Voiceout ("Set Flaps to POS2"), message ("Set Flaps to POS2") @ CAPT AND FO
Retract Spoilers else Vibrate, Chime. Flash, Voiceout ("Set Flaps to POS2"), message ("Set Flaps to POS2") @ CAPT and FO
If not (Take Off or Approach), then
If Speed<90 Message ("Low Speed") Vibrate, Voiceout (Low speed) and Engine status, Icing status, Attitude Status, Indicated Air speed
Set Landing Lights ON else message ("Set Landing Lights ON") @ CAPT In the examples above, the modes refer to various types of flight modes, particularly Preflight, Start Up, and Take Off. Other types of modes may be provided. Generally, the modes provide a time context in which the rules are applicable, and thus, the condition must be met. The conditions generally refer to a state of one of more aircraft parameters. In the examples provided above, the conditions generally relate to equipment checks. However, in other embodiments, the conditions may be altitude-based (e.g., above or below a threshold altitude), speed-based (e.g., above or below a threshold speed), distance-based (e.g., within a particular distance of a geographical location), time-based (e.g., estimated travel time for reaching a particular reference location), directional (e.g., the aircraft is located in a particular direction relative to a particular reference location), environmental (e.g., temperatures/winds above/below a particular threshold), or other user-specific or aircraft-specific conditions. In some exemplary embodiments, the mode may be considered a condition to be met in conjunction with the subsequent parameter condition.

With respect to the result, the terms "vibrate", "chime", "message", "flash", and "voiceout" refer to the various types of alerts generated by the alert unit 170 on the wearable device 110. For example, "vibrate" refers to the initiation of a haptic signal in which the wearable device 110 vibrates to alert the operator. "Chime" refers to an audible warning emitted by the wearable device 110. "Flash" refers to a visual signal emitted by the wearable device 110, such as a blinking screen or point of light. "Voiceout" refers to an audible spoken message emitted by the wearable device 110. "Message" refers to a textual or graphical message rendered by the wearable device 110 on the display unit 140. Finally, the terms "CAPT" and "FO" refer to the particular wearable devices 110, 112 worn by the captain and first officer operators, respectively.

In a second step 320, the processing unit 120 may retrieve and/or receive information regarding the mode of the aircraft via the communication unit 160. Mode information may be provided by, for example, the FMS 182. In some embodiments, the mode information may be provided by another avionics system or aircraft computer, and in further embodiments, the mode information may be manually entered by the operator on the wearable device 110, e.g., via user interface 150.

In a third step 330, the processing unit 120 may additionally retrieve and/or receive information associated with current aircraft parameters via the communication unit 160. The current aircraft parameters may be provided by, for example, the FMS 182, although other avionics systems or aircraft computers may provide such information. The aircraft parameters may include, for example, the aircraft speed, altitude, and heading. Additional aircraft parameters may include equipment status, weather information, navigation information, and the like. Further parameters may include reporting points or crossing points (e.g., latitude and longitude coordinates associated with a task), traffic information, terrain information, operational conditions (e.g., such as the engagement or disengagement of lateral and/or vertical guidance (LNAV/VNAV)) or when autopilot modes change, and communication notifications, (e.g., such as controller-pilot data-link communication (CPDLC) notifications). These parameters may be received via the communication unit 160 of the wearable device 110 in a format that enables the processing unit 120 to extract the relevant parameter for further processing.

In a fourth step 340, the processing unit 120 may generate display signals representing one or more of the parameters and send the display signals to the display unit 140 for presentation to the operator wearing the wearable device 110.

Figure 4:
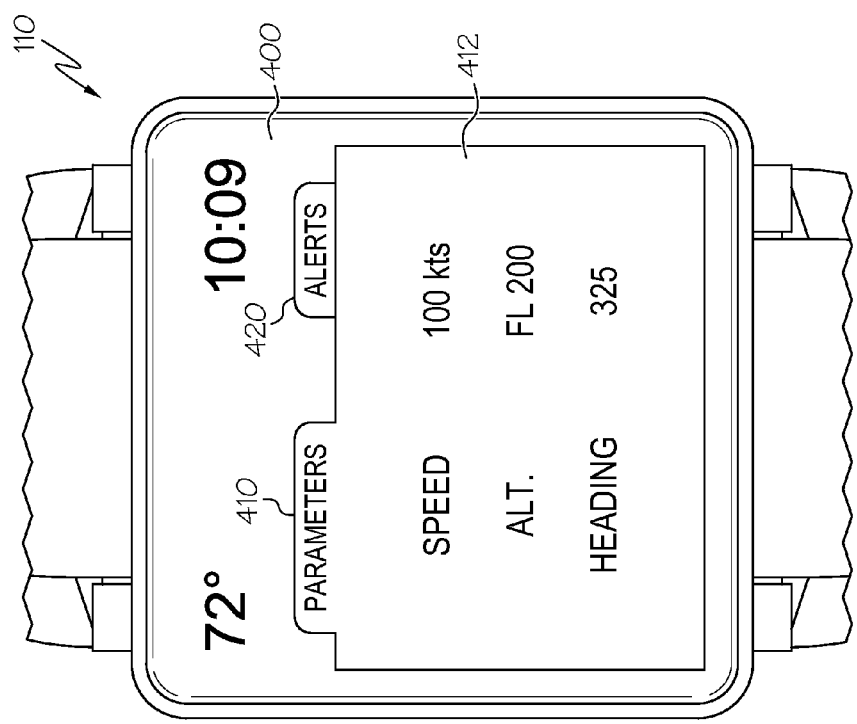
FIG. 4 is a first exemplary display rendered by the aircraft system of FIG. 1 and method of FIG. 3 in accordance with an exemplary embodiment.

Reference is additionally made to FIG. 4, which is a representation of a display 400 rendered on the display unit 140 of the wearable device 110 in accordance with an exemplary embodiment. In the depicted embodiment, the display 400 may be rendered on a touchscreen display that functions as the display unit 140 and the user interface 150. As shown, the display 400 may include tabs 410, 420 that represent different screens for display to the operator. The display 400 also includes the current time and temperature. In this exemplary embodiment, the tabs 410, 420 represent screens associated with the aircraft parameters and the alerts, with an aircraft parameters screen 412 being currently displayed. As shown, the aircraft parameters screen 412 provides alphanumerical representations of the parameters, particularly the current aircraft speed, altitude, and heading. Any appropriate aircraft parameters may be provided. In one exemplary embodiment, the parameters displayed on the parameter screen 412 correspond to the parameters that result in the alerts described below. Such a display provides an indication of the underlying issue and enables the operator to monitor the parameter to determine when the condition has been met and the alert may be removed.

Returning to FIG. 3, in a fifth step 350, the processing unit 120 may also evaluate the parameters in view of the rule set stored in database 130. In one exemplary embodiment, the processing unit 120 may evaluate the parameters in view of the rule set in the context of the current mode of the aircraft, as discussed above. In particular, the processing unit 120 may review each rule in the rule set, determine the associated parameter, and determine if the associated parameter has a state that results in an alert. In other words, the processing unit 120 determines if the associated parameter violates or satisfies the condition, and based on this determination, implements the appropriate consequence as an alert or no action.

For some rules of the rule set, the processing unit 120 further determines if the respective rule is applicable to the particular wearable device 110. As discussed above, the rules of the rule set may only be designated for the captain of the aircraft and/or for the first officer of the aircraft, each of which may be wearing the wearable device 110 (or wearable device 112). As such, if the associated parameter has a state that violates the condition and the alert is designated for the individual wearable device 110, the processing unit 120 initiates the alert.

In a further step 360, upon initiation of the alert, the processing unit 120 generates control signals to implement the designated alert via the alert unit 170. For example, if the alert is a "vibrate", the alert unit 170 commands a haptic component to vibrate the wearable device 110. Similarly, the alert unit 170 may generate a visual text message on the display unit 140 (e.g., for a "message" alert), generate an audible sound (e.g., for a "chime"), generate a spoken message (e.g., for a "voiceout"), or a combination of various types of alerts.

Figure 5:
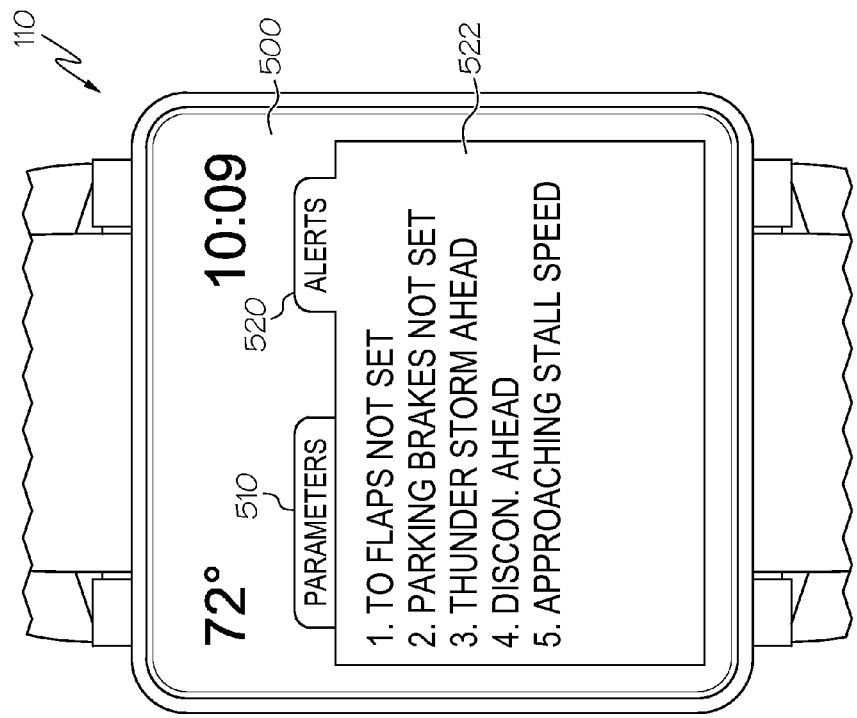
FIG. 5 is a second exemplary display rendered by the aircraft system of FIG. 1 and method of FIG. 3 in accordance with an exemplary embodiment.

Reference is briefly made to FIG. 5, which is a representation of a display 500 rendered on the display unit 140 of the wearable device 110 in accordance with an exemplary embodiment. As in FIG. 4, the display 500 may be rendered on a touchscreen display that functions as the display unit 140 and the user interface 150. As shown, the display 500 may include tabs 510, 520 that represent different screens for display to the operator. In this exemplary embodiment, the tabs 510, 520 represent screens associated with the aircraft parameters and the alerts with an alert screen 522 being currently displayed. In this exemplary embodiment, the alert screen 522 depicts a list of alert messages. Generally, these alert messages correspond to the alert conditions that have been violated in view of the aircraft parameters and for which the designated response is a message. In other embodiments, the alert screen 522 may provide a summary of all recent or current alerts, including haptic and audible alerts. In this particular depicted embodiment, the messages are the result of conditions associated with equipment (e.g., flaps and parking brakes), weather (e.g., thunderstorms), navigation (e.g., flight plan discontinuities), and operation (e.g., stall speed). Any appropriate aircraft alert may be provided.

Figure 6:
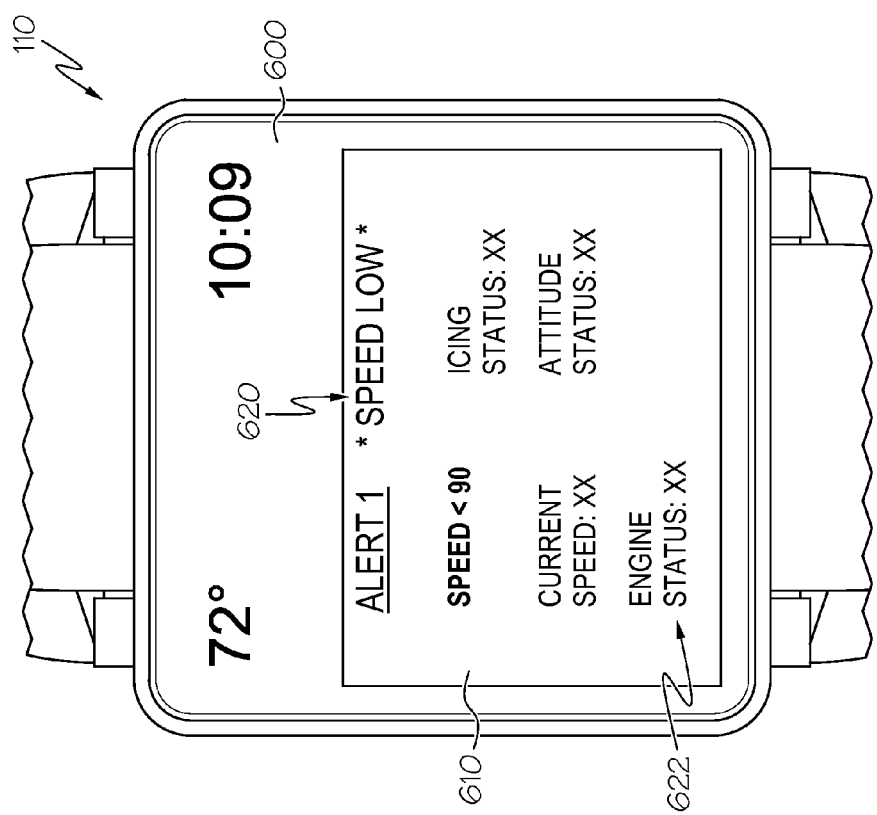
FIG. 6 is a second exemplary display rendered by the aircraft system of FIG. 1 and method of FIG. 3 in accordance with an exemplary embodiment.

Reference is briefly made to FIG. 6, which is a representation of a display 600 rendered on the display unit 140 of the wearable device 110 in accordance with a further exemplary embodiment. As in FIGS. 4 and 5, the display 600 may be rendered on a touchscreen display that functions as the display unit 140 and the user interface 150. As shown, the display 600 may include an alert screen 610 that presents the current alert 620 (e.g., a low speed alarm) as well as parameters 622 associated with alert. For example, for this particular alert 620, the relevant parameters include the condition that resulted in the alert (e.g., a speed of less than 90), the current speed, the engine status, icing status, and attitude status. As such, the alerts 620 and relevant parameters 622 are presented to the user in a single screen.

Returning to FIG. 3, in a further step 370, the processing unit 120 evaluates whether or not the alert should be continued. In one exemplary embodiment, the wearable device 110 may continue to generate the alert until the operator silences and/or accepts the alert via the user interface 150 on the wearable device 110 (e.g., by tapping the wearable device 110). In other embodiments, the wearable device 110 may continue to generate the alert until the condition that forms the basis of the associated rule of the rule set no longer results in the alert. In other words, the process described above may be iterative in which processing unit 120 continues to receive aircraft parameters, evaluate aircraft parameters in view of the rule set, and initiate the alert, as appropriate.

In a further step 380, the wearable device 110 may also communicate with various aircraft systems that independently monitor aircraft parameters and other types of information to generate alerts and warnings. These systems may initiate alerts that are independent of the alerts initiated by the processing unit 120 of the wearable device 110. Such systems may include the FMS 182, the EGPWS 184, the TCAS 186, and IRS 188. Generally, these systems initiate alerts on the primary flight display or other types of cockpit displays. In one exemplary embodiment, the communication unit 160 of the wearable device 110 may additionally receive the alert information from these systems. In response, the processing unit 120 generates display commands to display the warning on the display unit 140. In further embodiments, the processing unit 120 may additionally or alternatively command the alert unit 170 to initiate any suitable type of alert, including those discussed above. The nature and type of alert that is communicated by the wearable device 110 based on the alerts from other aircraft systems may be designated by the operator, for example, via the user interface 150 and/or according to the rule set stored in database 130. As noted above, the method 300 may be an iterative process such that, upon completion of step 380, the method 300 may return to step 320 to continue monitoring the mode information and parameters in view of the rule set.

Accordingly, the exemplary embodiments discussed above provide improved systems and methods for communicating alerts to an aircraft operator. In particular, exemplary embodiments enable the creation and implementation of a rule set that specify the nature and type of alert to be communicated with the operator. Further, exemplary embodiments include a wearable device that communicates directly with aircraft systems. Since the wearable device is worn on the body of the operator, the operator is continuously aware of the current state and performance of the aircraft, even when the particular operator may be outside of the cockpit or otherwise unable to immediately recognize a conventional aircraft system warning on a cockpit display screen. Exemplary embodiments also provide a primary or redundant check on safety and operation procedures or checklists that may have been otherwise overlooked. As such, exemplary embodiments improve safety and efficiency of aircraft operation.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A wearable device to be worn by an operator of an aircraft, comprising:
   a communication unit configured to receive aircraft parameters from an aircraft system;
   a database configured to store a rule set that defines at least a first rule with a first alert condition and a first response associated with the first alert condition;

a processing unit coupled to the communication unit and the database, the processing unit configured to evaluate the first alert condition in view of the aircraft parameters and to initiate the first response when the aircraft parameters violate the first condition; and an alert unit coupled to the processing unit and configured to communicate the first response to the operator.

2. The wearable device of claim 1, further comprising a watch housing that at least partially houses the communication unit, database, processing unit, and alert unit.

3. The wearable device of claim 1, wherein the rule set includes a plurality of the alert conditions and responses.

4. The wearable device of claim 1, further comprising a display unit coupled to the processing unit and the alert unit, and wherein alert unit is configured to communicate the first response as a message rendered on the display unit.

5. The wearable device of claim 4, wherein the processing unit is further configured to generate display commands representing at least one of the aircraft parameters for display on the display unit.

6. The wearable device of claim 5, wherein the processing unit is further configured to generate display commands representing the at least one of the aircraft parameters and the message associated with the first response on a single screen.

7. The wearable device of claim 1, wherein the alert unit is configured to communicate the first response as a haptic signal.

8. The wearable device of claim 1, wherein the alert unit is configured to communicate the first response as a flashing light or an audible sound.

9. The wearable device of claim 1, wherein the processing unit is further configured to initiate the alert based on an identity of the operator.

10. The wearable device of claim 1, wherein the communication unit is further configured to receive an aircraft system alert from the aircraft system, and wherein the processing unit is configured to initiate a second response based on the aircraft system alert and the alert unit is configured to communicate the second response to the operator.

11. The wearable device of claim 1, wherein the communication unit is configured to receive the aircraft parameters according to an avionics standard.

12. An aircraft system, comprising:
an aircraft data source configured to generate aircraft parameters; and
a wearable device configured to be worn by an operator and coupled to the aircraft data source, the wearable device comprising:
  a communication unit configured to receive the aircraft parameters from the aircraft data source;
  a database configured to store a rule set that defines at least a first rule with a first alert condition and a first response associated with the first alert condition;
  a processing unit coupled to the communication unit and the database, the processing unit configured to evaluate the first alert condition in view of the aircraft parameters and to initiate the first response when the aircraft parameters violate the first condition;
  an alert unit coupled to the processing unit and configured to communicate the first response to the operator; and
  a display unit coupled to the processing unit and the alert unit, and wherein alert unit is configured to communicate the first response as a message rendered on the display unit, wherein the processing unit is further configured to generate display commands representing at least one of the aircraft parameters for display on the display unit.

13. The aircraft system of claim 12, further comprising a watch housing that at least partially houses the communication unit, database, processing unit, and alert unit.

14. The aircraft system of claim 12, wherein the rule set includes a plurality of the alert conditions and response.

15. The aircraft system of claim 12, wherein the alert unit is configured to communicate the first response as an audible sound.

16. The aircraft system of claim 12, wherein the alert unit is configured to communicate the first response as at least one of a haptic signal or a flashing light.

17. The aircraft system of claim 12, wherein the processing unit is further configured to initiate the alert based on an identity of the operator.

18. The aircraft system of claim 12, wherein the communication unit is configured to receive the aircraft parameters according to an avionics standard.

19. The aircraft system of claim 12, wherein the aircraft parameters include at least one of aircraft speed, aircraft altitude, or aircraft heading.

20. The aircraft system of claim 12, wherein the aircraft parameters include at least one of equipment status, weather information, or navigation information.

* * * * *